United States Patent
Lang et al.

(10) Patent No.: US 12,024,178 B2
(45) Date of Patent: Jul. 2, 2024

(54) EVALUATING LOCATING MEASUREMENTS OF A SURROUNDINGS SENSOR FOR A MOTOR VEHICLE

(71) Applicant: Robert Bosch GmbH, Stuttgart (DE)

(72) Inventors: Stefan Lang, Benningen (DE); Thomas Gussner, Ludwigsburg (DE)

(73) Assignee: ROBERT BOSCH GMBH, Stuttgart (DE)

(*) Notice: Subject to any disclaimer, the term of this patent is extended or adjusted under 35 U.S.C. 154(b) by 570 days.

(21) Appl. No.: 17/279,336

(22) PCT Filed: Oct. 1, 2019

(86) PCT No.: PCT/EP2019/076565
§ 371 (c)(1),
(2) Date: Mar. 24, 2021

(87) PCT Pub. No.: WO2020/126142
PCT Pub. Date: Jun. 25, 2020

(65) Prior Publication Data
US 2021/0403005 A1 Dec. 30, 2021

(30) Foreign Application Priority Data
Dec. 20, 2018 (DE) .......................... 102018222686.5

(51) Int. Cl.
*B60W 40/12* (2012.01)
*B60W 40/08* (2012.01)
(Continued)

(52) U.S. Cl.
CPC ............ *B60W 40/12* (2013.01); *B60W 40/08* (2013.01); *G01S 7/411* (2013.01);
(Continued)

(58) Field of Classification Search
None
See application file for complete search history.

(56) References Cited

U.S. PATENT DOCUMENTS

2014/0072233 A1  3/2014 Horwood
2014/0324339 A1* 10/2014 Adam .................. G01S 13/726
                                                       701/519

FOREIGN PATENT DOCUMENTS

CN   201732163 U   2/2011
CN   107688179 A   2/2018
(Continued)

OTHER PUBLICATIONS

DE102006019474 translation (Year: 2006).*
(Continued)

*Primary Examiner* — Whitney Moore
(74) *Attorney, Agent, or Firm* — NORTON ROSE FULBRIGHT US LLP; Gerard A. Messina

(57) ABSTRACT

A method for evaluating locating measurements of a surroundings sensor for a motor vehicle. The method includes: associating locating measurements with an object described by an estimated object state, for the locating measurements in each case an association probability being determined for the association of the locating measurement with the object; estimating instantaneous state parameters of the object, including an adaptation of the state parameters to the locating measurements associated with the object, weightings of the locating measurements associated with the object being taken into consideration during the adaptation, for the locating measurements in each case the weighting being dependent on the determined association probability for the association of the particular locating measurement with the object; and transferring the estimated instantaneous state parameters of the object to a state estimator for updating the estimated state of the object. A sensor system is also described.

14 Claims, 3 Drawing Sheets

(51) Int. Cl.
  *G01S 7/41*     (2006.01)
  *G01S 13/88*    (2006.01)
  *G06F 18/2415*  (2023.01)
  *G06V 20/56*    (2022.01)
(52) U.S. Cl.
  CPC ......... *G06F 18/2415* (2023.01); *G06V 20/56* (2022.01); *B60W 2554/4049* (2020.02); *G01S 13/88* (2013.01)

(56) References Cited

FOREIGN PATENT DOCUMENTS

| CN | 108226920 A    | 6/2018  |
|----|----------------|---------|
| DE | 102006019474 A1 | 10/2007 |
| DE | 102011017323 A1 | 10/2011 |
| WO | 2018085107 A1  | 5/2018  |

OTHER PUBLICATIONS

International Search Report for PCT/EP2019/076565, Issued Jan. 8, 2020.
Roos, F., et al., "Reliable Orientation Estimation of Vehicles in High-Resolution Radar Images," IEEE Transactions on Microwave Theory and Techniques 64.9, 2016, pp. 1-8. <https://oparu.uni-ulm.de/xmlui/bitstream/handle/123456789/6571/oparu_mtt.pdf?sequence=1&isAllowed=y> Downloaded Mar. 24, 2021.
Julier, et al.: "A New Extension of the Kalman Filter to Nonlinear Systems," SPIE Proceedings, 3068, (1997), pp. 1-12, XP055608764.
Julier, et al.: "Reduced Sigma Point Filters for the Propagation of Means and Covariances Through Nonlinear Transformations," Proceedings of the American Control Conference, (2002), pp. 887-892, XP010596484.

* cited by examiner

EVALUATING LOCATING MEASUREMENTS OF A SURROUNDINGS SENSOR FOR A MOTOR VEHICLE

FIELD

The present invention relates to a method for evaluating locating measurements of a surroundings sensor for a motor vehicle, in which locating measurements and associated measuring uncertainties of the locating measurements are obtained from the surroundings sensor.

BACKGROUND INFORMATION

In driver assistance systems for motor vehicles, for example in systems for automatic distance regulation or in collision warning systems, radar sensors are frequently used for detecting the traffic surroundings.

Of late, there is increasing interest in radar sensors having ever greater angular resolution and angular separability, which are able to detect a large number of radar reflections in the case of an extensive object, depending on size and distance.

Roos et al., "Reliable Orientation Estimation of Vehicles in High-Resolution Radar Images," IEEE Transactions on Microwave Theory and Techniques 64.9 (2016), 2986-2993, describe a clustering algorithm, which during the assignment of radar measurements to an object operates independently from existing knowledge about the object. This, however, may result in leaps in the object parameters, such as orientation or extension.

An assignment of each individual measurement associated with an object to a corresponding point of a detailed object model, in contrast, would require high model knowledge with respect to object type and object extension, which, however, is not always reliably available.

SUMMARY

It is an object of the present invention to provide a method for evaluating locating measurements of a surroundings sensor for a motor vehicle, which allows a state estimation of an object to be enhanced in an efficient manner.

According to the present invention, this object is achieved by the features in accordance with an example embodiment of the present invention. Advantageous refinements and embodiments of the present invention are described herein. The surroundings sensor may be a radar sensor, for example.

The estimation of instantaneous state parameters of the object may, in particular, take place by adapting the state parameters to the locating measurements associated with the object. The estimation of instantaneous state parameters, taking the weightings into consideration, may also be referred to as weighted estimation, weighted adaptation, or weighted fitting.

A feature of the approach in accordance with an example embodiment of the present invention is that a respective association probability is determined for new measurements associated with an object which has already been created, and the association probabilities are incorporated in weightings for a weighted fit of model parameters (state parameters). The fit may, for example, take place for a straight segment which describes an edge of an object, for the state parameters of location, orientation, and minimum and maximum of a validity range (end points of the straight segment), and the straight segment is thus newly estimated.

By incorporating multiple measurements in a parameter estimation of state parameters of the object, the data amount of an object may be decreased, and a more robust description of a plurality of objects may be made possible. In the process, at the same time, an iterative update of states of objects may take place by the state estimator. Compared to a conventional assignment of individual measurements to defined points of a model, a greater robustness is thus achieved.

In particular, the robustness of the method may be increased compared to systematic deviations between locating measurements and the model which are not included in the model, as a result of the weighting of the parameter adaptation of the state parameters. Examples of such systematic deviations are, e.g., systematic deviations in the radial velocity of reflections at rotating wheels or, e.g., deviations of real object edge profiles of a modeling in the form of a straight segment.

A locating measurement may, for example, encompass measurements of distance r, radial velocity vr, and/or of an object angle phi, for example an azimuth angle. In the case of a surroundings sensor in the form of a radar sensor, the locating measurements correspond to radar reflections at an object.

An object state may, for example, encompass state parameters of a rectangular box or of an edge in surroundings of the surroundings sensor, such as for example a Cartesian position, an extension, and/or a velocity in Cartesian coordinates.

The fact that a determination or calculation depends on a variable means here that the variable is an input variable of the determination or calculation, and that the result of the determination or calculation depends thereon. In particular, an input variable of the calculation includes different values for which different results are obtained.

The association probability may, in particular, represent a probability of the locating measurement representing an exact locating of a real object to which the estimated object state relates. The association probability may, for example, indicate a probability of the particular locating measurement belonging to the object described by the estimated object state. In other words, the association probability may indicate a probability of the locating measurement having been received by the real object which is described by the estimated object state.

For example, the estimated object state may be taken into consideration during the determination of the association probability, increasing association probabilities being determined for increasing spatial agreements of a measured location of a locating measurement with the estimated object state, and/or increasing association probabilities being determined for increasing agreements of a measured velocity of a locating measurement with the estimated object state.

Different association probabilities are preferably taken into consideration by different weightings (weights). The association probability is determined as one of multiple values, which include multiple intermediate values between a lower limit (e.g., zero) and an upper limit (e.g., one). For example, the association probability may be determined from a set of discrete values or from a value range.

During the adaptation of the state parameters to the locating measurements associated with the object, the weighting for the locating measurement is in each case dependent on the determined association probability for the association of the particular locating measurements with the object. For example, increasing weightings may be used, in particular, for increasing association probabilities. For example, the association probabilities may be used as weightings of the locating measurements during the adaptation of the state parameters to the locating measurements associated with the object.

In one or multiple specific embodiment(s) of the present invention, the association probability is determined, taking the measuring uncertainty of the locating measurement into consideration, during the determination of the association probability for the association of a locating measurement with the object. For example, the measuring uncertainty of the locating measurement may be taken into consideration by a reduction of the particular association probability, it being possible for greater reductions to take place for increasing measuring uncertainties.

In one or multiple specific embodiment(s) of the present invention, the association probability is determined, taking an uncertainty of the estimated state of the object into consideration, during the determination of the association probability for the association of a locating measurement with the object. For example, the uncertainty of the estimated state of the object may be taken into consideration by a reduction of the particular association probability, it being possible for greater reductions to take place for increasing uncertainties of the estimated object state.

In one or multiple specific embodiment(s) of the present invention, the association probability is determined, taking a model uncertainty of the estimated state of the object into consideration, during the determination of the association probability for the association of a locating measurement with the object. For example, the model uncertainty may correspond to an expected deviation of real objects from a model underlying the object. In particular, the model uncertainty may, for example, encompass a shape uncertainty. For example, the model uncertainty in the case of an object based on a geometric model may describe the deviations from the model which are expected as a result of the real shapes of a passenger car and truck deviating from the geometric model. For example, the model uncertainty in the case of an object based on a model of a rectangular box (or a straight edge) may describe the deviations from the model which are expected as a result of the real shapes of a passenger car and truck deviating from the box shape (or the shape of a straight edge).

In the step of associating obtained locating measurements with the object described by an estimated object state, a locating measurement is preferably only associated with the object described by the estimated object state when the association probability for the association reaches a minimum value. This is also referred to as gating. In this way, the locating measurements, based on which the estimation of instantaneous state parameters of the object is carried out, are incorporated in the estimation using respective weights, the respective weighting being dependent on the determined association probability. In the process, above the minimum value, different association probabilities are taken into consideration by different weightings. As a result, not just a sorting of locating measurements and an equivalent consideration of the remaining locating measurements take place.

The association of obtained locating measurements with an object described by an estimated object state may encompass an association of obtained locating measurements with one or multiple sub-object(s) of an object described by an estimated object state. An association with a sub-object of an object also represents an association with the object.

The instantaneous state parameters, which are estimated in the step of estimating instantaneous state parameters of the object, may, for example, be state parameters of one or multiple sub-object(s) of the object. In this way, for example, state parameters of a lateral edge of a rectangular box may be estimated based on locating measurements associated with the lateral edge.

The method preferably includes: updating the estimated state of the object by the state estimator, based on the prior estimated state of the object and the estimated instantaneous state parameters of the object. The update may thus be an iterative update. The method particularly preferably includes: generating a forecast (prediction) of a new object state by the state estimator, based on the prior estimated state of the object; and correcting the forecast of the new object state by the state estimator, based on the estimated instantaneous state parameter of the object.

For the iterative update of the estimated state of the object, additionally uncertainties of the estimated instantaneous state parameter of the object may be taken into consideration, which are estimated based on the measuring uncertainties of the measurements.

The state estimator is preferably configured to update the estimated state of the object, based on the estimated instantaneous state parameters of the object. In other words, the state estimator is configured to determine a new state of the object, based on the prior estimated object state and the estimated instantaneous state parameters of the object. The state estimator is particularly preferably configured to generate a forecast (prediction) of a new object state, based on a prior estimated state of the object, and to correct the prediction, based on the estimated instantaneous state parameter of the object, for updating the object state. This may be a Kalman filter, an extended Kalman filter, an unscented Kalman filter or another conventional state estimator, for example.

The method in accordance with an example embodiment of the present invention preferably includes the steps:
  obtaining measuring uncertainties of locating measurements from the surroundings sensor; and
  estimating uncertainties of the estimated instantaneous state parameters of the object, based on the obtained measuring uncertainties of the locating measurements associated with the object,
  the estimated instantaneous state parameters of the object and the estimated uncertainties being transferred to the state estimator for updating the estimated state of the object.

The method may furthermore include, for example: updating an estimated uncertainty of the estimated state of the object by the state estimator.

According to one refinement of the present invention, the uncertainties of the fitted model parameters are determined with the aid of an unscented transform (UT).

For example, the estimation of uncertainties of the estimated instantaneous state parameters of the object may take place with the aid of an unscented transform, including the steps:
  calculating sigma points of the unscented transform, a vector, which includes the locating measurements associated with the object, being used as a mean value estimation for a distribution of the sigma points to be calculated; and a matrix, which includes the measuring uncertainties of the locating measurements associated with the object, being used as a covariance matrix for the distribution of the sigma points to be calculated;
  estimating instantaneous state parameters of the object for each sigma point of the unscented transform, including an adaptation of the state parameters to the particular sigma point;

determining a variance of a distribution of the instantaneous state parameters of the object, estimated for the sigma points, as an estimation of the uncertainties of the estimated instantaneous state parameters of the object.

A vector of the locating measurements which were associated with the object, for which the uncertainty may be indicated by the measuring uncertainties of the locating measurements, and, if necessary, also their covariances, is thus given as an input variable of the unscented transform. According to the method of unscented transform, the sigma points are selected in such a way that the distribution of the sigma points has a mean value and a covariance which correspond to a given mean value in the form of the vector of the locating measurements associated with the object and to a given covariance in the form of the matrix, which includes the measuring uncertainties of the locating measurements associated with the object. The distribution of the sigma points and their covariance thus represent the locating measurements associated with the object and their measuring uncertainties.

The sigma points are transformed by carrying out the estimation of instantaneous state parameters of the object for each sigma point. A respective sigma point is thus transformed into estimated instantaneous state parameters of the object.

The (co)variance of the transformed sigma points then indicates an estimated uncertainty of the estimated instantaneous state parameters of the object.

By transforming the sigma points into respective estimations of the instantaneous state parameters of the objects, the unscented transform thus makes it possible to obtain an estimation of the uncertainties of the estimated instantaneous state parameters.

In this way, the unscented transform may afford to supply an estimation of the uncertainties of the estimated instantaneous state parameters of the object. This is particularly advantageous since the parameter adaptation (also referred to as fit) usually represents a non-linear map, and measuring uncertainties would be distorted by a non-linear map or mapped with a bias. By determining the uncertainties with the aid of the unscented transform, enhanced estimations of the uncertainties may already be obtained during a transformation of radial coordinates of locating measurements into Cartesian model coordinates of an object.

Weightings for the sigma point, which are dependent on weightings of the covariance matrix, are preferably considered during the adaptation of the state parameters to the respective sigma point.

For example, during the adaptation of the state parameters to the particular sigma point, the same weightings may be used as during the adaptation of the state parameters to the locating measurements associated with the object (in the step of estimating instantaneous state parameters of the object).

The present invention furthermore relates to a sensor system including a surroundings sensor for motor vehicles, in which one of the above-described methods is implemented.

One exemplary embodiment is described in greater detail hereafter based on the figures.

DETAILED DESCRIPTION OF EXAMPLE EMBODIMENTS

Figure 1:
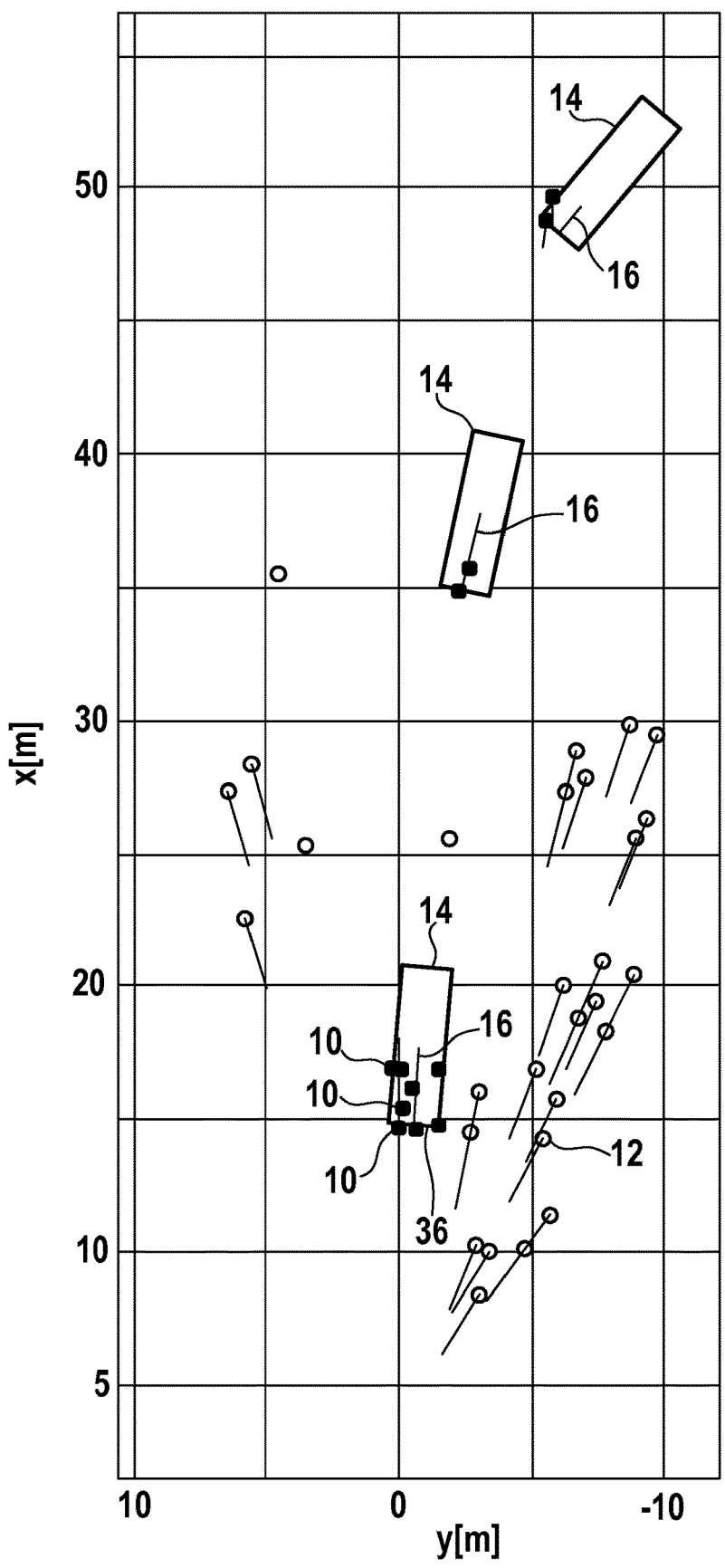
FIG. 1 shows a schematic representation of surroundings of a motor vehicle, in accordance with an example embodiment of the present invention.

FIG. 1 schematically shows surroundings of a surroundings sensor of a motor vehicle, including multiple locating instances detected in a detection area of the surroundings sensor, which hereafter are referred to as locating measurements 10 and 12. In addition, objects 14 are shown, which represent real objects in the form of motor vehicles and are modeled in the form of rectangular boxes. In the model, each object is assigned a position in Cartesian coordinates X, Y, an extension, an orientation, and a velocity in the form of a velocity vector 16. An individual locating measurement 10, 12, for example, encompasses a radial distance r, a radial relative velocity vr, as well as a directional angle in the form of an azimuth angle phi, in each case based on the inherent position of the surroundings sensor or of the host vehicle at x=0, y=0.

FIG. 1 shows locating measurements 10 which were associated with an object 14 with the aid of solid symbols. Locating measurements 12 which were not associated with any of objects 14 are represented by an open symbol.

Figure 2:
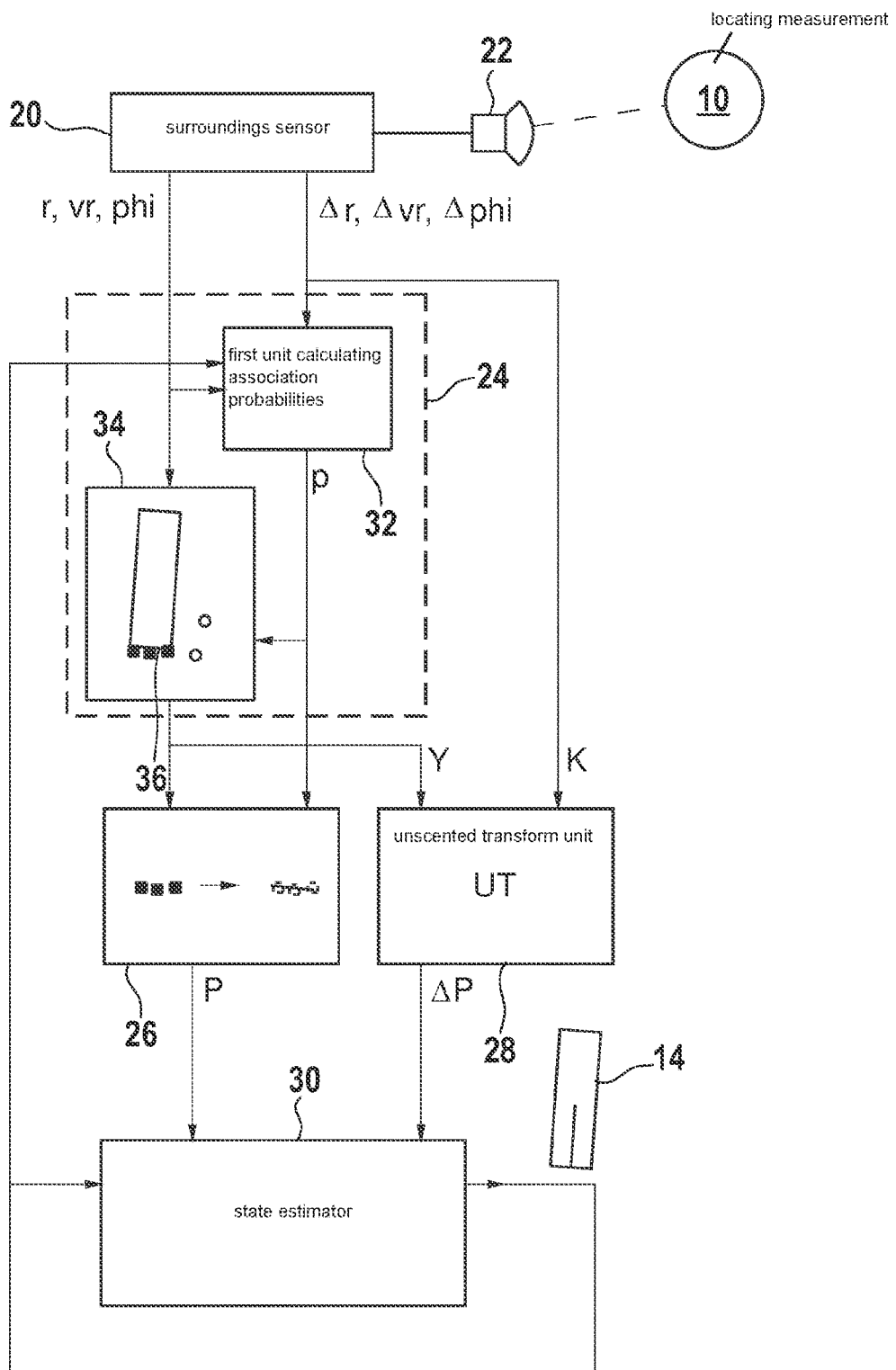
FIG. 2 shows a schematic diagram of a sensor system for a motor vehicle including a surroundings sensor, in accordance with an example embodiment of the present invention.

FIG. 2 schematically shows a sensor system including a surroundings sensor 20 in the form of a radar sensor including an antenna system 22. Furthermore, a locating measurement 10 corresponding to a located radar reflection is schematically represented.

An evaluation unit of the sensor system includes an association unit 24 for associating locating measurements 10 with an object 14, an adaptation unit 26 for carrying out a fit for adapting state parameters to locating measurements 10 associated with an object 14, an unscented transform unit 28 for estimating uncertainties of the adapted instantaneous state parameters, as well as a state estimator 30 for iteratively updating an estimated state of object 14.

Association unit 24 includes a first unit 32 for calculating association probabilities, as well as a second unit 34 for evaluating and associating locating measurements 10 with an object 14.

Locating measurements 10, 12 including, for example, parameters r, vr, phi, as well as related measuring uncertainties $\Delta r$, $\Delta vr$, $\Delta phi$ are obtained from surroundings sensor 20.

Initially, objects 14 are initialized in a conventional manner using an independent mechanism, such as for example a clustering of locating measurements 10, 12 not previously associated with objects 14, and a corresponding initialization of object states of the newly generated objects 14.

First unit 32 calculates association probabilities p for the respective objects 14 for the association of respective locating measurements 10, 12 with the particular object 14. Second unit 34 selects, for each object 14, locating measurements 10 to be associated with object 14 based on their association probability p, and associates these with the particular object 14. Locating measurements 12, which are only to be associated with an object 14 with a low association probability below a minimum value pmin, are sorted out, i.e., they are not associated. This is also referred to as gating. In the representation shown in FIG. 1, locating measurements 10 associated with respective objects 14 are represented with the aid of solid symbols.

The example shown in FIG. 2, by way of example, represents the association for a sub-object 36 of object 14 in the form of a front edge of object 14.

The determination of association probability p for the association of a locating measurement 10 with an object 14 (or sub-object 36) may, for example, take place taking into consideration:
measuring uncertainty Δr, Δvr, Δphi, for example in the form of a covariance in the measuring parameter space;
a prediction uncertainty of object 14 with respect to the parameters of the predicted state of object 14, such as position, velocity, extension, orientation; and/or
a model uncertainty, for example in the form of a shape uncertainty of object 14.

For example, a deviation in the range of +/−30 cm of individual locating measurements 10 from an exactly straight-line progress of the edge of the model of sub-object 36 may be taken into consideration as a shape uncertainty of a sub-object 36 in the form of an edge or a lateral edge of an object 14.

Based on the determined association probabilities p, a parameter estimation in the form of a weighted model fit for sub-object 36 or object 14 is then carried out. Adaptation unit 26, for example, carries out a weighted straight-line fit in the form of least squares straight-line fit or in the form of a weighted main component analysis. In this case, input variables of the fit are the positions of locating measurements 10. It is also possible to estimate a validity range of the adapted straight line, corresponding to the extension of sub-object 36. A weighted least squares model fit may also be carried out for an estimation of an instantaneous state parameter in the form of a velocity vx, vy of an object 14. For example, adaptation unit 26 may estimate the instantaneous state parameters vx and vy in model vr=vx*cos(phi)+vy*sin(phi), with an assumed yaw rate of object 14 of zero.

The instantaneous state parameters of an object 14 (or its sub-objects 36) estimated by adaptation unit 26 are transferred to state estimator 30.

To supply related uncertainties for the estimated instantaneous state parameters of an object 14 to state estimator 30, the uncertainties are estimated as follows by carrying out an unscented transform. Since both the straight-line fit and a fit using velocity equation vr=vx*cos(phi)+vy*sin(phi) are a non-linear relationship, an unscented transform is used.

All locating measurements 10 associated with an object 14 are combined into a shared vector Y. For this purpose, the individual locating measurements 10, which each have a measuring vector dimension n, and of which I locating measurements 10 exist, are combined to a vector having length N=n*I. A covariance matrix K of the combined measuring vector Y is generated, for example by combining the covariances of the individual locating measurements 10 in a block diagonal matrix. The covariance matrix has a size N×N. If covariances between the locating measurements are known, they may be documented in minor block diagonals.

Figure 3:
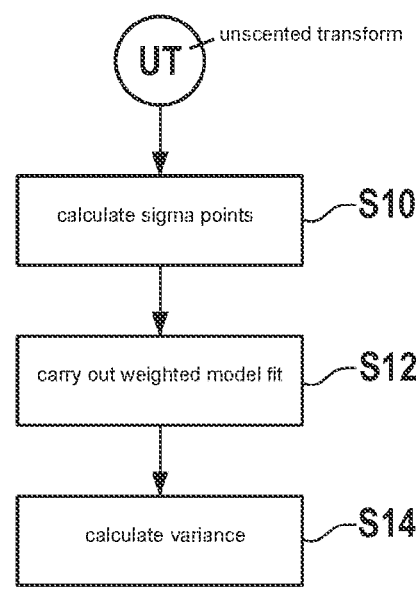
FIG. 3 shows a schematic flowchart of an unscented transform for determining uncertainties of estimated instantaneous state parameters of an object, in accordance with an example embodiment of the present invention.

FIG. 3 shows carrying out the unscented transform (UT) in the form of a schematic flowchart. In a step S10, sigma points are calculated based on the combined measuring vector Y and its combined covariance K, as is conventional for the unscented transform. In the case of a total measuring vector Y of dimension N, 2N+1 sigma points are calculated. The weighted model fit (step S12) is carried out for each of the sigma points. This corresponds in each case to the adaptation carried out by adaptation unit 26. The resulting 2N+1 results of the adaptation represent a distribution, whose variance (covariance matrix) represents an estimation of the uncertainties of the instantaneous state parameters of object 14 which are estimated by adaptation unit 26. The variance (covariance matrix) is accordingly calculated from the distribution of 2N+1 results (step S14). It is transferred, together with the estimated instantaneous state parameters, to state estimator 30.

State estimator 30 iteratively updates the estimated state of object 14 based on the estimated instantaneous state parameters transferred by adaptation unit 26, and the related estimation of the uncertainties of the estimated instantaneous state parameters of the object 14 which was transferred from unscented transform unit 28.

The estimated instantaneous state parameters of the object represent a pseudo measurement P. The estimation of the uncertainties of the estimated instantaneous state parameters of the object, i.e., the pseudo measurement P, is transferred to state estimator 30 in the form of variance ΔP. Taking measuring uncertainties ΔP of pseudo measurement P into consideration thus makes it possible to increase the reliability of the update of the estimated object state by state estimator 30.

State estimator 30 may additionally estimate and update the extensions of object 14 with the aid of the estimated instantaneous state parameters of object 14 (or its sub-objects 36). In this way, it is also possible, for example to incrementally detect even very large objects, such as e.g., trucks, entirely in their extension. A more precise estimation of the extension of an object 14 may then, in turn, result in a better association of new locating measurements 10 by association unit 24, in a subsequent iteration (corresponding to a subsequent measuring cycle). Accordingly, the orientation of object 14 may also be updated.

The described steps may in each case be executed accordingly for all objects 14 and locating measurements 10 associated therewith.

The invention claimed is:

1. A method for a surroundings sensor for a motor vehicle, the comprising the following steps:
using a predefined model to initialize an identification of presence of an object with a set of object parameters that defines a state of the object;
subsequent to the initialization:
obtaining from the surroundings sensor a plurality of locating measurements that each indicates a presence at a respective location;
associating a subset of the obtained locating measurements with the object whose presence was previously identified with the initialization using the predefined model; and
assigning to each of the locating measurements of the subset a respective association probability that represents a respective likelihood of the association of the respective locating measurement with the object whose presence was previously identified with the initialization using the predefined model; and
based on the associating, updating the state of the object defined by the set of object parameters of the object based on the subset of the obtained locating measurements, wherein:
for each of the subset of the obtained locating measurements, a respective effect of the respective obtained locating measurement on the update is weighted according to the respective association probability assigned to the respective locating measurement so that different ones of the subset of the obtained locating measurements are differently weighted than one another; and the updating of the state of the object includes updating at least one of an identification of a shape of the object and an identification of a size of the object.

2. The method as recited in claim 1, wherein the association probability is a probability that a location of the locating measurement is a location of a real object that corresponds to the object whose presence was previously identified with the initialization using the predefined model.

3. The method as recited in claim 1, wherein the assigning of the association probability is based on a measuring uncertainty of the locating measurement.

4. The method as recited in claim 1, wherein the assigning of the association probability is based on an uncertainty of the object parameters of the object.

5. The method as recited in claim 1, wherein the assigning of the association probability is based on an uncertainty of the predefined model used for the initialization in which initial settings of the object parameters of the object are set.

6. The method as recited in claim 1, the method further comprising the following steps:
obtaining measuring uncertainties of the locating measurements from the surroundings sensor;
estimating uncertainties of a current state of the object parameters of the object based on the obtained measuring uncertainties of the locating measurements associated with the object, wherein the updating is performed based on the current state of the object parameters and the estimated uncertainties of the object parameters.

7. The method as recited in claim 6, wherein the estimation of uncertainties is carried out using an unscented transform, the locating measurements associated with the object and the obtained measuring uncertainties of the locating measurements associated with the object being used as input variables of the unscented transform.

8. The method as recited in claim 7, wherein the estimation of uncertainties includes performing the following steps:
calculating sigma points of the unscented transform using:
a vector, which includes the locating measurements associated with the object, as a mean value estimation for a distribution of the sigma points; and
a matrix, which includes the measuring uncertainties of the locating measurements associated with the object as a covariance matrix for the distribution of the sigma points;
estimating updated object parameters for each of the sigma points of the unscented transform, including an adaptation of the object parameters to the respective sigma point; and
determining a variance of a distribution of the updated object parameters of the object, estimated for the sigma points, as the estimation of the uncertainties.

9. The method as recited in claim 1, wherein the updating includes the updating of the recorded shape.

10. The method as recited in claim 1, wherein the updating includes the updating of the recorded size.

11. The method as recited in claim 1, wherein the assigning of the respective association probability is based on an uncertainty of the locating measurement.

12. The method as recited in claim 1, wherein the assigning of the respective association probability is based on an uncertainty of the set of object parameters.

13. The method as recited in claim 1, wherein the assigning of the respective association probability is based on an expected deviation from the predefined model used for the initialization of the presence of the object parameters.

14. A sensor system for a motor vehicle, comprising:
a surroundings sensor; and
a processor configured to:
use a predefined model to initialize an identification of presence of an object with a set of object parameters that defines a state of the object;
subsequent to the initialization:
obtain from the surroundings sensor a plurality of locating measurements that each indicates a presence at a respective location;
associate a subset of the obtained locating measurements with the object whose presence was previously identified with the initialization using the predefined model; and
assign to each of the locating measurements of the subset a respective association probability that represents a respective likelihood of the association of the respective locating measurement with the object whose presence was previously identified with the initialization using the predefined model; and
based on the association, update the state of the object defined by the set of object parameters of the object based on the subset of the obtained locating measurements;
wherein:
for each of the subset of the obtained locating measurements, a respective effect of the respective obtained locating measurement on the update is weighted according to the respective association probability assigned to the respective locating measurement so that different ones of the subset of the obtained locating measurements are differently weighted than one another; and
the update of the state of the object includes updating at least one of an identification of a shape of the object and an identification of a size of the object.

* * * * *